June 28, 1966     S. DONALDSON     3,257,749
STRAIGHT PULL BOLT ACTION RIFLE
Filed Nov. 23, 1964     8 Sheets-Sheet 4
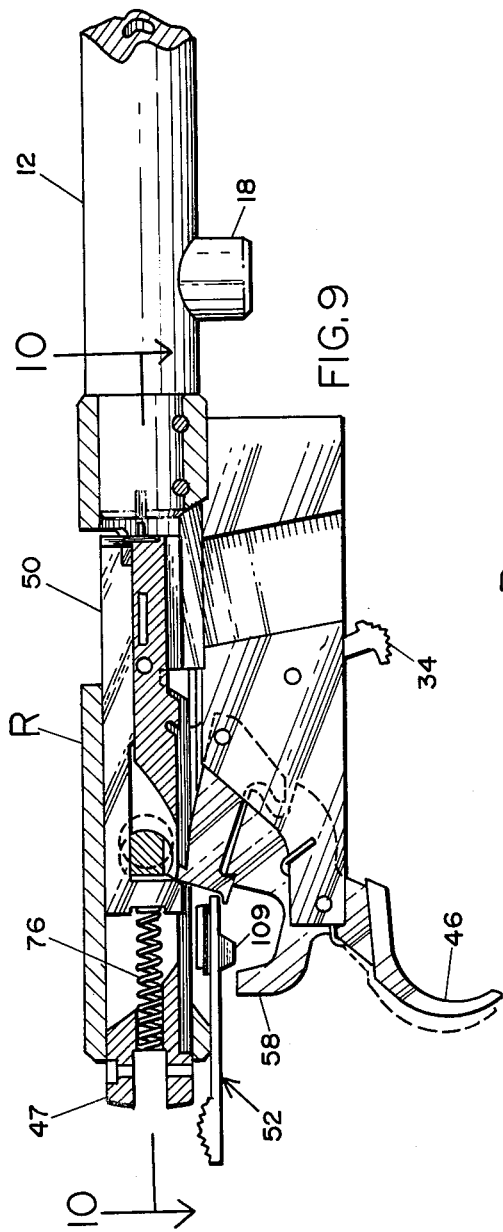
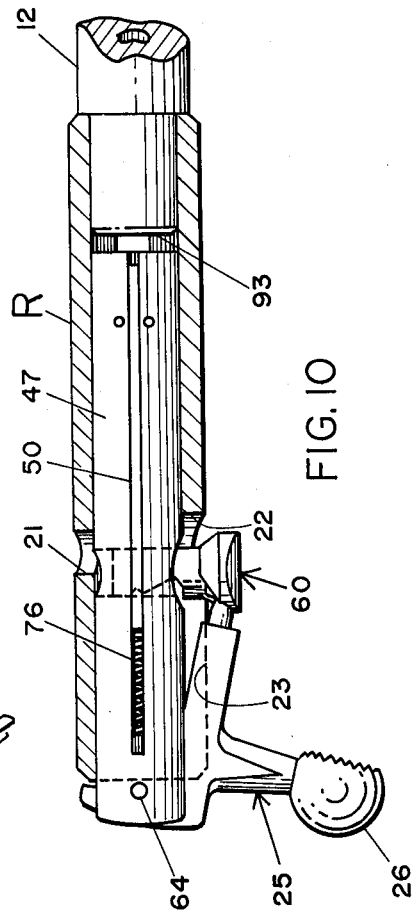
INVENTOR.
STANLEY DONALDSON
BY
*Salvatore G. Militana,*
attorney

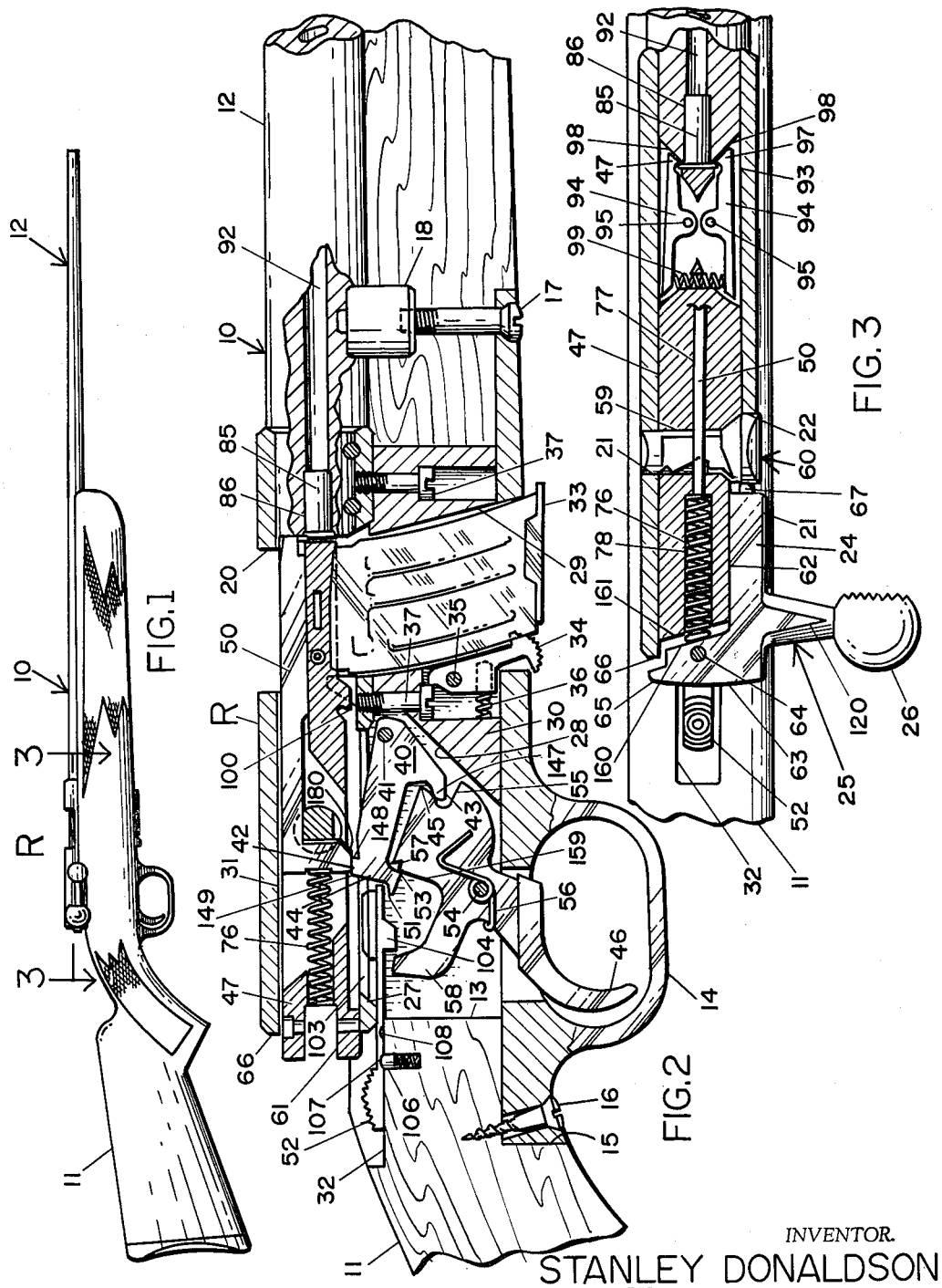

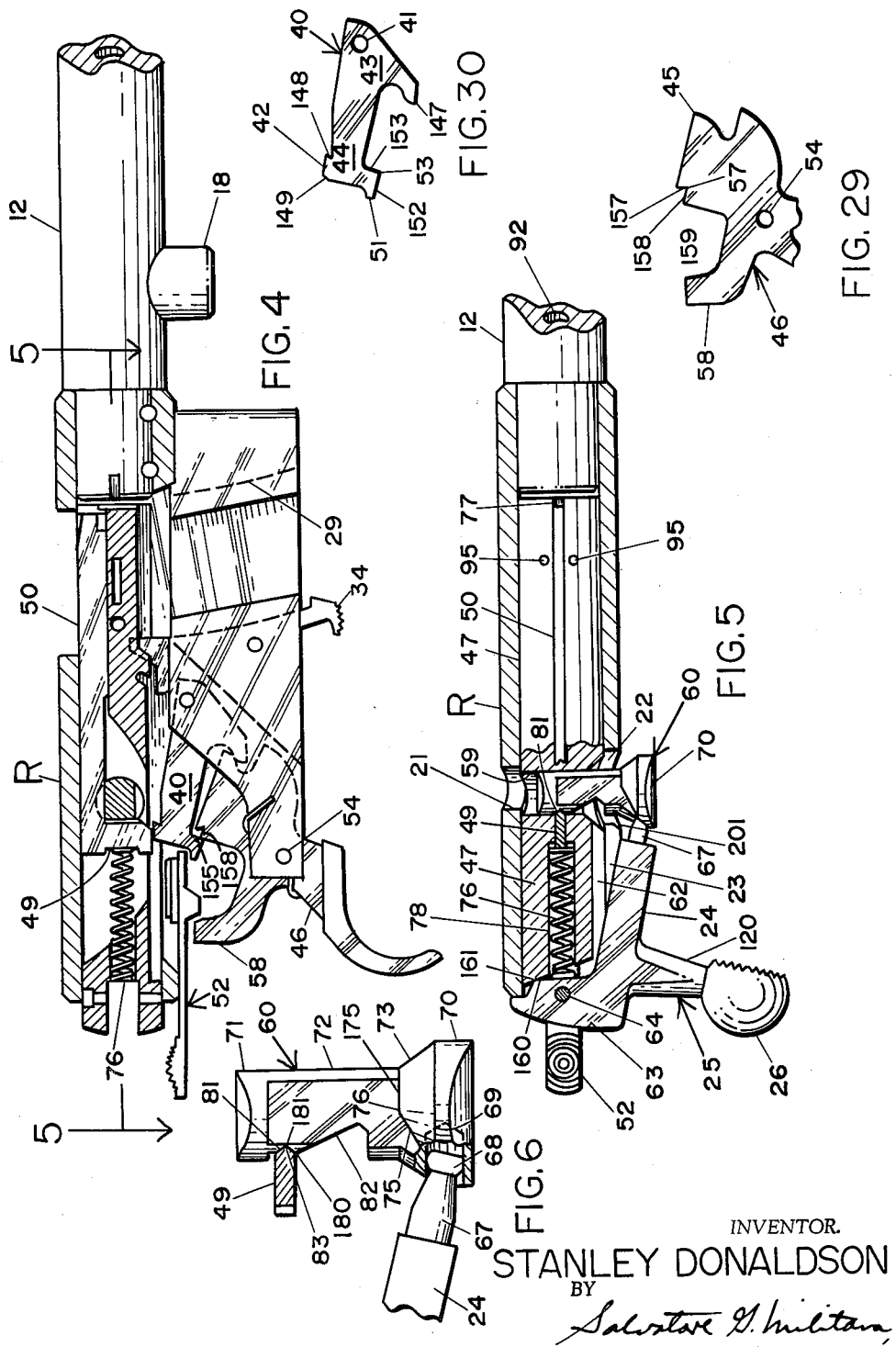

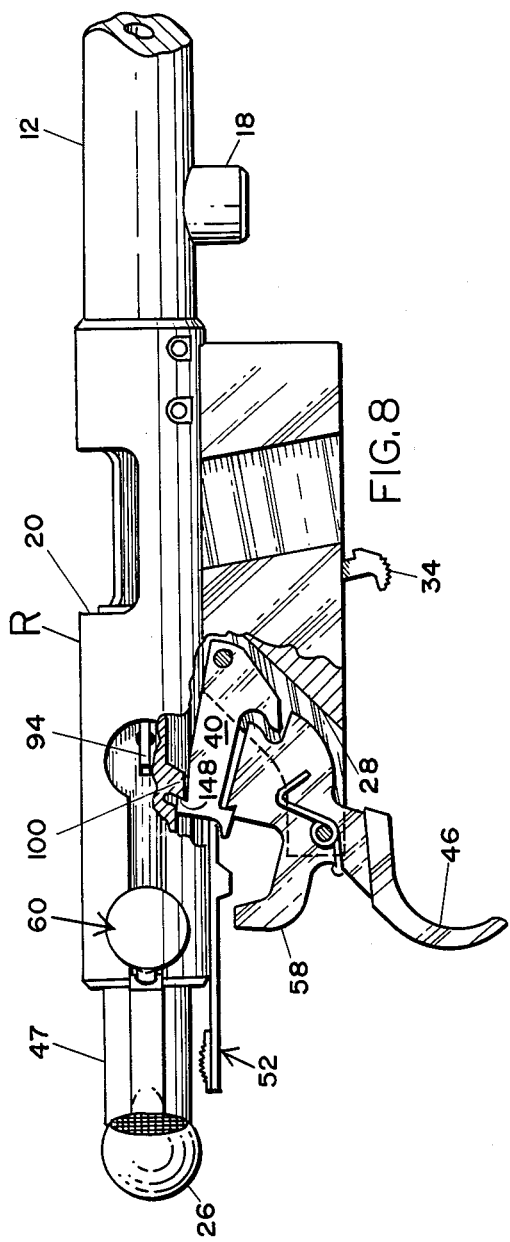
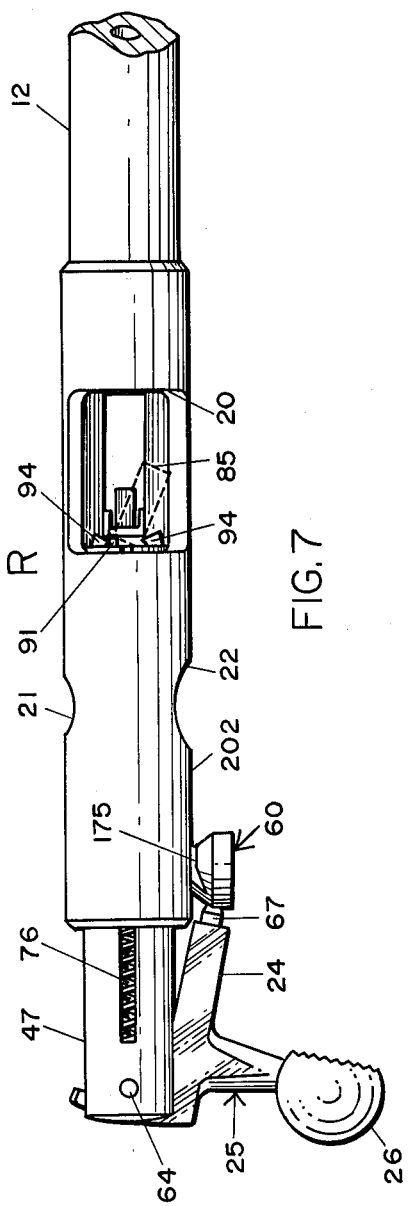

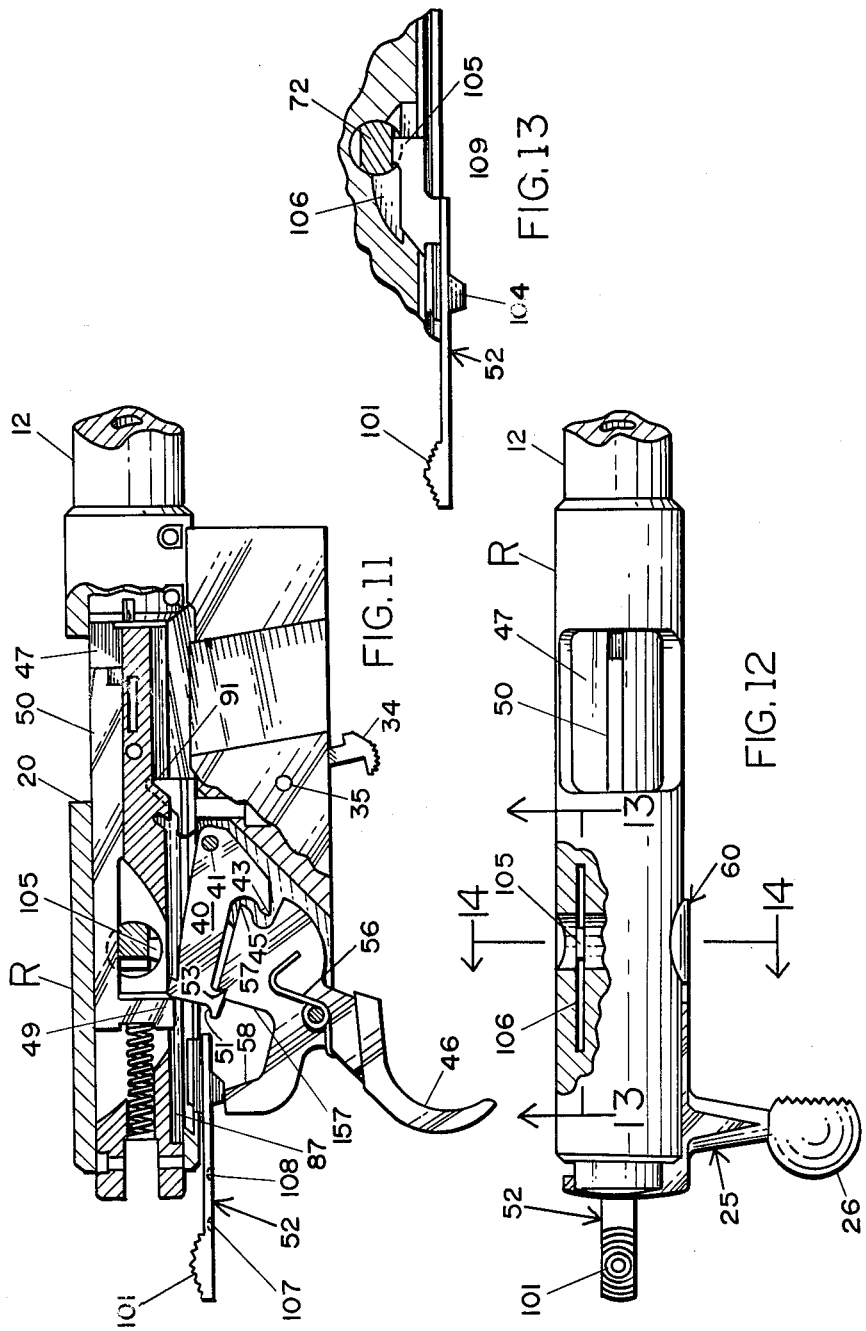

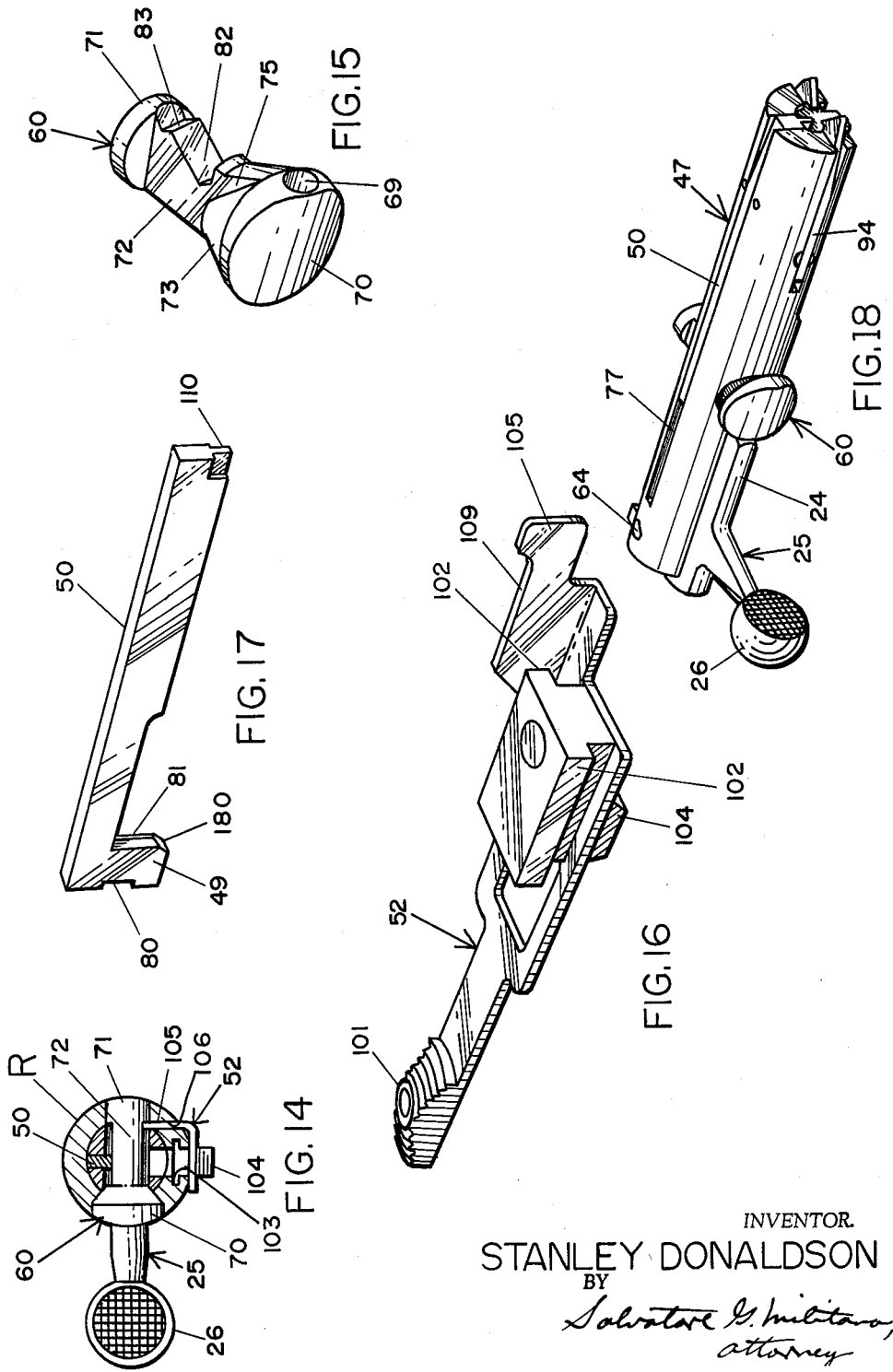

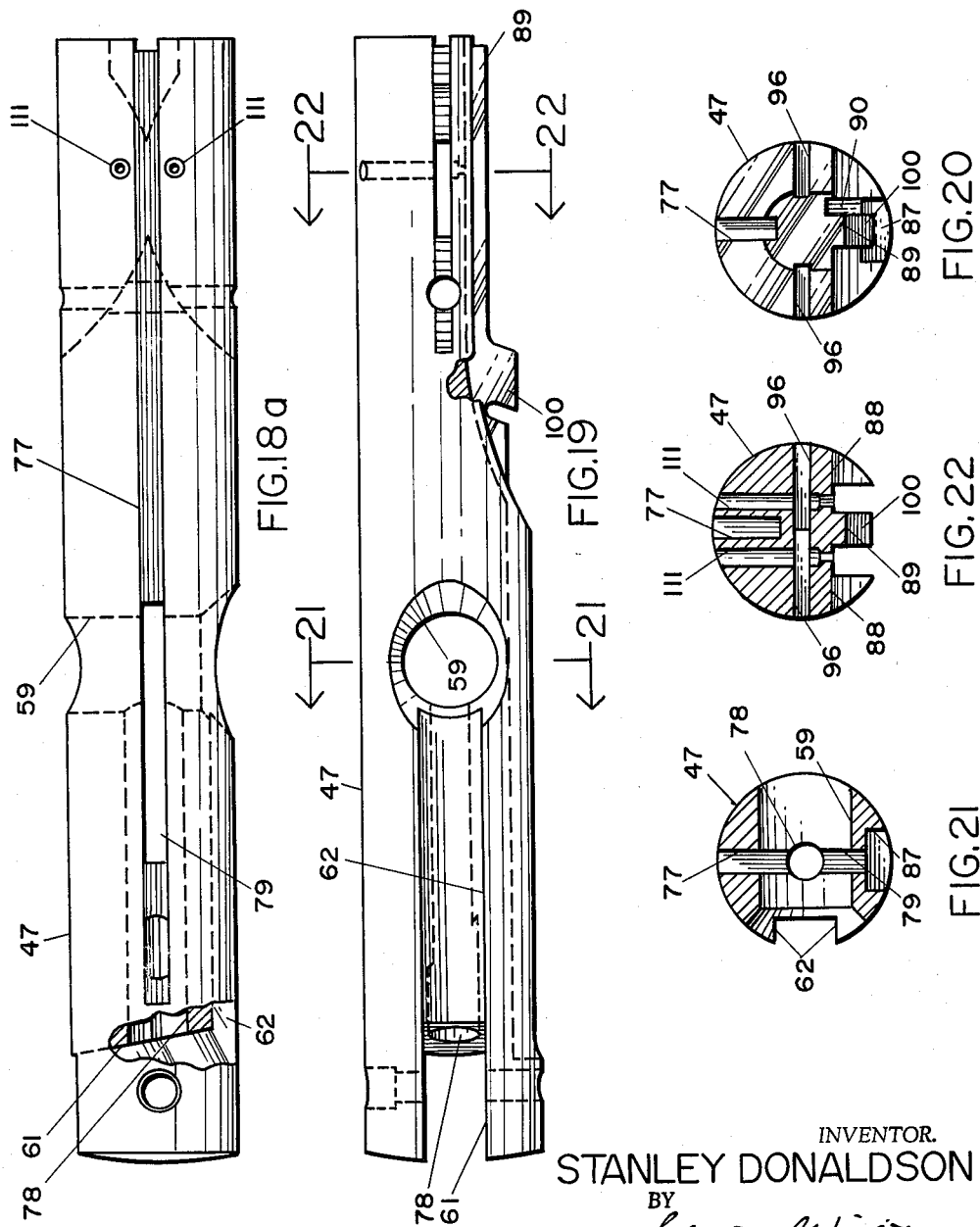

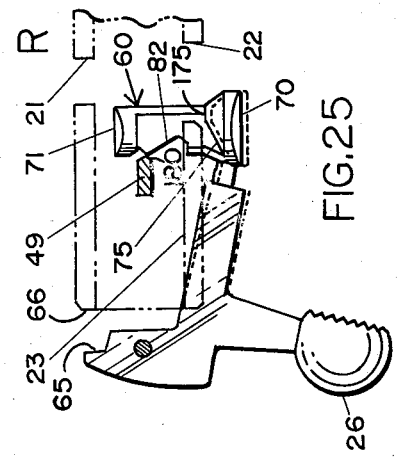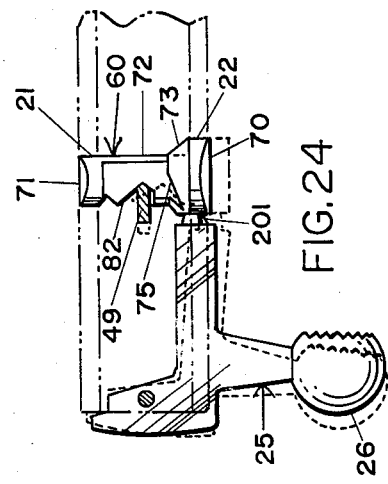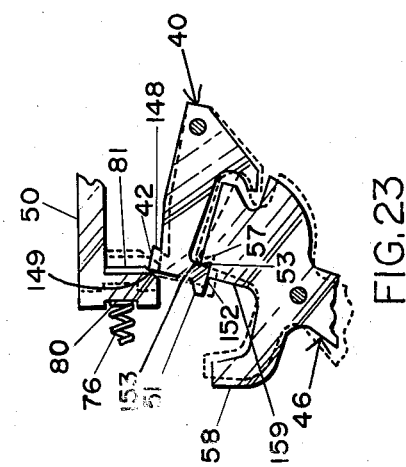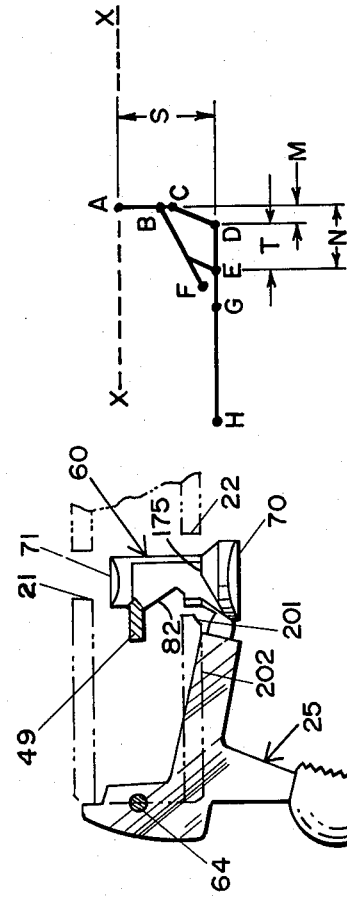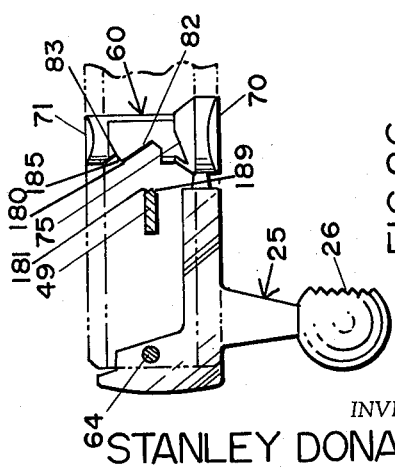
INVENTOR.
STANLEY DONALDSON

United States Patent Office 3,257,749
Patented June 28, 1966

3,257,749
STRAIGHT PULL BOLT ACTION RIFLE
Stanley Donaldson, Saguache, Colo., assignor to Browning Industries, Inc., a corporation of Utah
Filed Nov. 23, 1964, Ser. No. 412,958
21 Claims. (Cl. 42—16)

This invention relates to rifles but is more particularly directed to a straight pull bolt action rifle.

A principal object of the present invention is to provide a straight pull bolt action rifle, whose locking mechanism for securing the bolt in its firing position is visible, reliable, extremely safe and whose function and operation is readily appreciated and understood by the person using the gun to thereby give the user confidence in using the rifle under all conditions.

Another object of the present invention is to provide a straight pull bolt action rifle in which the firing pin is partially cocked upon withdrawal of the bolt and later completely cocked upon returning the bolt to its firing position thereby retracting the firing pin out of the way of the cartridge being loaded from the magazine and dividing the force necessary to completely cock the firing main spring, allowing the rifle to have a relatively strong main spring and a relatively short stroke of the firing pin with a resulting fast lock time and positive ignition of the cartridge without causing the action to be too stiff to operate easily and smoothly.

A further object of the present invention is to provide a straight pull bolt action rifle whose mechanism is so constructed that a left handed rifle, of which there is none on the present market, may be manufactured by use of most of the parts of the right handed rifle thereby permitting interchangeable parts in both type of rifles and reducing the cost thereof to a minimum.

A still further object of the present invention is to provide a straight pull bolt action rifle with an operating handle which operates as a powerful lever during the primary extraction of a sticky or deformed cartridge after being fired, in prying it from the chamber in the barrel of the rifle prior to ejecting the spent cartridge from the rifle.

A still further object of the present invention is to provide a straight pull bolt action rifle with a safety member which can place the rifle in a safety nonfiring condition with the bolt in an open position or in a closed or otherwise ready to fire position.

A still further object of the present invention is to provide a straight pull bolt action rifle with a cross bolt which effectively prevents the firing of the rifle when in an unlocked or partially unlocked position so that the rifle can be fired when the cross bolt is in its fully locked position.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a side elevational view of a rifle embodying my invention.

FIGURE 2 is an enlarged longitudinal, vertical cross sectional view of my rifle with the action shown in the locked and fired position and the operating handle having been removed.

FIGURE 3 is a cross sectional view taken along the line 3—3 of FIGURE 1 with the operating handle shown in position.

FIGURE 4 is a view similar to FIGURE 2 with the stock removed showing the first phase of the cocking action and the main bolt in an unlocked position.

FIGURE 5 is a cross sectional view taken along the line 5—5 of FIGURE 4.

FIGURE 6 is an enlarged detailed view of the cross bolt mechanism showing the firing pin in its partially cocked position resulting from the lateral movement of the cross bolt.

FIGURE 7 is a top plan view thereof showing the cartridge being ejected in dotted lines.

FIGURE 8 is a fragmentary side elevational view of my rifle partially broken away showing the position taken by the bolt when brought to its rear position.

FIGURE 9 is a side elevational view partially in section with the action shown in a partially cocked position and the cross bolt in its forward movement commencing to slide laterally preparatory to locking the main bolt.

FIGURE 10 is a partial cross sectional view taken along the line 10—10 of FIGURE 9.

FIGURE 11 is a view similar to FIGURE 9 showing the action in its fully cocked position with the safety in the "on" position.

FIGURE 12 is a top plan view thereof partially broken away.

FIGURE 13 is a fragmentary cross sectional view taken along the line 13—13 of FIGURE 12.

FIGURE 14 is a cross sectional view taken along the line 14—14 in FIGURE 12.

FIGURE 15 is a perspective view of the cross bolt.

FIGURE 16 is a perspective view of the safety member.

FIGURE 17 is a perspective view of the firing pin.

FIGURE 18 is a perspective view of the main bolt assembly.

FIGURE 18a is a top plan view of the main bolt.

FIGURE 19 is a side elevational view thereof.

FIGURE 20 is an end view thereof.

FIGURES 21 and 22 are cross sectional views taken along the lines 21—21 and 22—22 respectively of FIGURE 19.

FIGURE 23 is an enlarged detail view of the trigger, sear and firing pin mechanism in their cocked position with the dotted lines illustrating the positions taken by the various parts when the trigger is pulled in firing the rifle.

FIGURE 24 is a schematic drawing showing the initial opening movement of cross bolt.

FIGURE 25 is a similar view illustrating the intermediate movement of the cross bolt as a rearward force is applied on the operating handle and the dotted lines showing the extreme lateral position of the cross bolt.

FIGURE 26 is a similar view showing the various parts in a cocked and locked position.

FIGURE 27 is a similar view illustrating the movement of the cross bolt when a sticky cartridge is lodged in the firing chamber.

FIGURE 28 is a graphic view of the movement of the cross bolt during the various stages thereof.

FIGURE 29 is a side view of my trigger alone.

FIGURE 30 is a similar view of my sear.

Referring to the drawings wherein like numerals are used to designate similar parts throughout the several views, the numeral 10 refers generally to my rifle which consists of a stock 11 grooved longitudinally at 32 in its upper surface for receiving a receiver R and a barrel 12 with a slot 13 extending vertically through the stock 11 for receiving the action of my rifle. A trigger guard 14 is mounted in a slotted portion 15 formed in the lower surface of the stock 11 and secured thereto by a trigger guard screw 16 at the rear portion of the trigger guard 14 and a bolt 17 at the other end. The bolt 17 is threaded into a barrel lug 18 which is fastened to the barrel 12 whereby the trigger guard 14 and stock 11 become fastened to the barrel 12.

The receiver R, which is cylindrical in cross section and having a longitudinally disposed bore 31, is provided with an opening 20 through which a fired cartridge is ejected and a small opening 21 at one side of the receiver R with an enlarged opening 22 in the other side of the receiver R in alignment with the smaller opening 21. A slot 23 extends from the rear edge of the receiver R to the enlarged bore 22 receiving an arm 24 of an operating handle 25 on which a knob 26 is mounted. At an outer edge 202 of the slot 23 there is an inclined surface 201 joining the slot 23 and the bore 22 of the receiver R.

At the bottom portion of the receiver R is a slot 27 which extends from adjacent the rear edge of the receiver R to adjacent the front edge thereof. The slot 27 communicates with a chamber 28 in a rear part of a magazine housing 30 and a chamber 29 at the forward part of the housing 30. The chamber 29 receives a cartridge clip 33 which is retained in position therein by a magazine latch 34 pivoted by a latch pin 35. A coil spring 36 yieldingly maintains the magazine latch 34 in its extended or latched position. The housing 30 is secured to the receiver R by bolts 37 extending through appropriate bores in the housing 30.

With the chamber 28 in the upper portion thereof is a sear 40 pivoted at one end by a sear pin 41 while the other ends comprise arm portions 43 and 44. The arm portion 43 terminates in a lip 147 which may be engaged by a companion lip 45 on a trigger 46, while the arm portion 44 is provided an extension 42 having a forwardly facing surface 148 and a rearwardly facing shoulder 149 that extend through the slot 27 in the receiver R and are normally in the path of a bolt 47 slidably positioned in the bore 31 of the receiver R and of a firing pin 50 as is expalined in detail hereinafter. Also, on a lower part of the upper arm portion 44 of the sear 40 is a toe portion 51 that engages a safety member 52 to limit the upward rotation of the sear 40. In addition, there is a searing surface 53 which when received by a sear notch 57 of the trigger 46 prevents the downward swinging movement of the arm 44 of the sear 40 which function must occur to release a firing pin 50 in the firing of a cartridge. The sear 40 is in its cocked position when the searing surface 53 is positioned in the sear notch 57. The searing surface 53 is formed by a forwardly facing surface 153 joining a lower surface 152 while the sear notch 57 is formed by a diagonally extending surface 157 joining a lower wall 158 with a rearwardly extending side wall 159 of the trigger 46 joining the outer edge of the lower wall 158.

The trigger 46 that is pivoted as at 54 within the chamber 28 adjacent to the sear 40 is provided with a lip 45 positioned in close proximity to a lip 147 of the sear 40 and with which lip 45 engages the lip 147 for rotating the sear 40 to permit removal of the bolt 47 when the trigger 46 is pressed and pivoted to its extreme rearward position. A stop arm 58 extends rearwardly and upwardly of the trigger 46 toward a safety 52 which is engaged when it is desired to place the trigger 46 in its locked position. When the trigger 46 is brought to its cocked position, as best shown by FIGURE 11, the sear 40 has been made to pivot clockwise to its upper position and the searing surface 53 has been received by the sear notch 57 of the trigger 46 and is resting therein. At this time, as best shown by solid lines in FIGURE 23, a camming surface 180 (see FIGURE 17) of the firing pin 50 is exerting a forwardly and downwardly directed force against the rearwardly facing shoulder 149 of the sear 40. Since the trigger 46 is acting as a prop for the sear 40, the latter is unable to rotate in a downward direction.

Upon pressing the finger piece of the trigger 46, the trigger 46 will rotate in a clockwise direction and the sear notch 57 will swing away from the searing surface 53 to the dotted line position until the latter is free of the sear notch 57. The downward and forward force of the camming surface 180 of the firing pin 50 imparted to it by the coil spring 76 will compel the sear 40 to pivot downwardly as the searing surface edge 153 slides downwardly along the surface 159 of the trigger 46 and releases the firing pin 50 as best shown by FIGURE 23. The sear 40 will come to rest with the edge 153 engaging the edge 159 of the trigger 46.

When the trigger 46 has been released by the person firing the rifle 10 the trigger spring 56 will rotate the trigger 46 about its pivot pin 54 in a counter clockwise direction to the solid line position with the side wall 159 bearing forcibly against the edge 153 of the sear 40. This causes the sear 40 to pivot about its pivot pin 41 in a clockwise direction until the upper surface of the sear lip 42 engages the bottom surface of the leg 49 of the firing pin 50 as indicated by FIGURE 2. During the cocking action of the firing pin 50, the leg 49 of the firing pin 50 will slide rearwardly away from the sear lip 42 releasing same. The force of the trigger spring 56 will cause the further rotation of the sear 40 in a clockwise direction until the searing surface 53 slides above the edge 159 of the trigger 46 and is received by the sear notch 57. In fact the sear 40 is forced to rotate until the upper surface of the sear lip 42 abuts against the upper surface of the slot 87 in the bolt 47. At this position, the edge 153 of the searing surface 53 will engage the inner surface 157 of the sear notch 57 while the lower surface 152 of the searing surface 53 will be spaced slightly above the lower surface 158 of the sear notch 57.

Th slide bolt 47 is provided with a transverse bore 59 of such size and configuration to receive a cross bolt 60 with a slot 61 across the rear end of the slide bolt 47 and a second slot 62 along the side of the bolt 47 joining the slot 23 and the bore 22 in the receiver R for receiving an operating leg member 24. The operating handle 25 is an L-shaped lever pivoted as at 64 within the slot 61 having a leg portion 63 lying within the slot 61 and the second leg 24 lying along the slot 62 with an operating knob 26 mounted on the end of an arm 120 for actuating the operating member 25. A projection 160 of the operating member 25 limits the swinging movement of the operating arm 24 by impinging on the surface 161 of the bolt 47. On the forward end of the leg portion 24 of the operating handle 25 is a link 67 whose free end 68 is spherical in shape and received by a bore 69 in the cross bolt 60. See FIGURE 6. By virtue of this structure, upon applying a rearward force on the operating handle knob 26, the operating member 25 will pivot on the pin 64 to a position wherein the surface 160 will abut against the surface 161 of the bolt 47 and the cross bolt 60 will have been withdrawn outwardly of the bore 21 as best shown by FIGURE 5. Only when there is a sticky cartridge in the firing chamber 86 will the projection 65 abut against the end portion 66 of the receiver R. Then, a powerful force imparted by the projection 65 engaging the end portion 66 will effectively release the sticky cartridge from the firing chamber 86 as is explained in detail hereafter.

At the ends of the cross bolt 60 are the heads 70 and 71 with a milled shank portion 72 joining the heads 70 and 71. The heads 70 and 71 fit in the bores 22 and 21 respectively formed in the receiver R while the shank 72 is of such width that it slides freely in the slot 23 of the receiver R as the bolt 47 is slid rearwardly during the cocking and reloading operation. To assist the forward movement of the main bolt 47 just prior to the heads 70 and 71 being received by the bores 22 and 21, a cone surface 73 is provided joining the head 70 and the shank 72 with ramps 75 formed on each side of the shank 72 of the cross bolt 60 on the rearward portion of the cone surface 73. As a forward force is applied on the knob 26 the main bolt 47 will slide forwardly in the receiver R until the cross bolt 60 has arrived at the position short of alignment with the aligned bores 21 and 22, the inclined surfaces 201 of the receiver R will engage the inclined notches or ramps 75 and slide the cross bolt 60 forwardly as the latter commences to slide inwardly of the transverse bore 59. By means of these two movements, the main bolt 47 is brought to its proper firing position for firing a cartridge while the cross bolt 60 is properly positioned to lock the bolt 47.

The sliding movement of the cross bolt 60 in an outward direction effects the partial compression of a main firing spring 76 which is positioned in a bore 78 in the rear portion of the bolt 47. The main spring 76 extends between the operating handle 25 and a leg portion 49 of the firing pin 50. The firing pin 50 lies in a longitudinally disposed slot 77 formed in the upper portion of the main bolt 47 with the leg portion 49 extending downwardly through a slot 79 formed on the lower surface of the main bolt 47. The rear edge 80 of the leg 49 bears against the main spring 76 while the front edge 81 of the leg 49 slides along an inclined surface 82 on the shank 72 of the cross bolt 60. At the lower portion of the front edge 81 is the camming surface 180. There is a notch 83 on the high side of the inclined surface or ramp 82 for seating the leg 49 of the firing pin 50 to prevent the leg 49 from sliding down the inclined surface 82 and to maintain the bolt 60 in its outward position while being manipulated as shown by FIGURE 25. When the cross bolt 60 is in its housed position, the leg 49 of an uncocked firing pin 50 will find itself in the low side of the ramp 82 and when the cross bolt 60 slides outwardly of the transverse bore 59, the leg 49 will slide up the inclined surface 82 and move rearwardly against the spring pressure 76. The firing end 110 of the firing pin 50 will then have slid rearwardly away from the cartridge 85 positioned in the firing chamber 86. The compression of the main spring 76 effected by the lateral or sideward sliding movement of the cross bolt 60 constitutes approximately one-half of the total cocking action of the firing pin 50. The second part of the cocking action of the firing pin 50 is brought about during the forward sliding movement of the main bolt 47 when the rearwardly facing shoulder 149 of the sear lip 42 engages the forward edge 180 of the leg 49 of the firing pin 50 to stop the forward movement of the firing pin 50. Any further forward movement of the main bolt 47 permits the bolt 47 to slide forwardly as the cross bolt 60 becomes aligned with the aligned bores 21 and 22 while the firing pin 50 remains stationary thereby compressing the main spring 76 to its full cocking position. The bottom surface of the main bolt 47 is provided with a slot 87 to permit the lower end of the leg 49 of the firing pin 50 to not extend beyond the bottom surface of the bolt 47 yet be in position to be engaged by the sear lip 42. The forward bottom surface of the main bolt 47 is likewise slotted as at 88 on each side of the longitudinal center line to form an elongated depending shoulder member 89 which engages the top cartridge in the magazine 33 to push the cartridge into the bore of the barrel 12 into firing position. Adjacent one side of the elongated shoulder member 89 is a deep slot 90 to permit the bolt 47 to slide freely over the ejector 91 which is mounted in the receiver R rearwardly of the magazine 33.

The magazine 33 is of conventional construction wherein cartridges are placed in a tier on a spring loaded support. The uppermost cartridge is contained on the clip by a pair of arcuate arms (not shown) that envelope the cap end of the cartridge. When the main bolt 47 slides forwardly, the forward edge of the elongated shoulder 89 engages the end of the topmost cartridge while sliding between the arcuate retaining arms. The cartridge is pushed until the bullet end is received by the bore 92 at the forward end of the receiver R. On continued forward movement of the main bolt 47, the cartridge frees itself of the magazine 33 and is shoved completely into the bore 92 with the rim of the cartridge engaging the forward wall 93 of the firing chamber 86. As the cartridge is being pushed into position in the bore 92, the extractor members 94 which are pivoted by pin 95 in slots 96 formed on opposite sides of the bolt 47 engage the rim of the cartridge by means of the inclined heads 97 which are undercut to engage the cartridge cap. The pivot pins 95 are positioned in bores 111. To permit the bolt 47 to be brought forwardly to its completely cocked position, the heads 97 which extend beyond the forward end of the bolt 47 are received by slots 98 on each side of the cartridge receiving chamber 86 on the rear end 93 of the barrel 12. A spring 99 positioned between the rear ends of the extractors 94 yieldingly maintain the forward ends or heads 97 in a direction toward each other.

In order to prevent the main bolt 47 from being withdrawn completely from the receiver R during the normal cocking action of the bolt 47, a shoulder 100 which faces rearwardly is positioned at the rear of the elongated shoulder 89. The shoulder 100 engages the forwardly facing shoulder 148 on the sear 40. If it is desired to withdraw the main bolt 47 from the receiver R, the trigger 46 is forced rearwardly causing the lip 45 to engage and depress the sear lip 147 on the sear 40. The sear 40 pivots on its pivot pin 41 to compel the sear arm 44 to swing downwardly and the sear shoulder 42 to leave the receiver R and be out of the path of the shoulder 100. Likewise when it is desired to return the main bolt 47 to the receiver R, the bolt 47 will slide in the bore 31 of the receiver R until the shoulder 100 of the bolt 47 engages the sear shoulder 42. Now upon pulling the trigger 46 rearwardly, the sear 40 will swing downwardly as explained hereinbefore and the sear shoulder 42 will swing downwardly out of the path of the bolt shoulder 100 and permit the bolt 47 to slide forwardly in the bore 31 of the receiver R.

The safety member 52 is slidably mounted to operate within the rearmost portion of the groove 32 formed in the stock 11 and is provided with a manual safety button 101 for sliding the safety member 52. At the forward end of the safety member 52 there is a plurality of rails 102 that permit the safety member 52 to slide along slots 103 formed in the receiver R on each side and above the slot 27. A head 104 is mounted on the lower surface of the safety member 52, which head when slid rearwardly and placed in the path of the swinging arm 58 of the trigger 46 will prevent any movement of the trigger 46 and thereby prevent the firing of the rifle. At the forward end of the safety member 52 and right angle thereto is an extension arm 109 having a safety finger 105 extending upwardly in a slot 106 formed along the inside wall of the receiver R at the position of the bore 21 in the receiver R. A spring loaded detent 106 mounted in the stock 11 below the safety member 52 in combination with recesses 107 and 108 prevent the inadvertent movement of the safety member 52 from its selected position while recess 107 prevents the safety member 52 from engaging the sear 40. When the safety member 52 has been pushed forwardly to seat the detent 106 in the recess 107, the safety member 52 is in its off position and the safety head 104 is out of the path of the stop arm 58 of the trigger 46. Also, the safety finger 105 will find itself forwardly of and out of alignment with the transverse bore 21. Consequently, the trigger 46 is free to be actuated and the cross bolt 60 is free to move laterally in the receiver R. When the safety member 52 is pulled rearwardly by applying a rearward force on the safety button 101, the arm 52 slides rearwardly until the detent 106 is received by the recess 108 and the safety 52 is deemed to be "on." The trigger 46 cannot be actuated at this time because the safety head 104 is in the path of the stop arm 58 of the trigger 46. Also, the safety finger 105 has been brought into alignment with the transverse bore 21 engaging the cross bolt 60 behind the head 71 of the cross bolt 60. The cross bolt 60 cannot slide laterally even if the trigger 46 were capable of being actuated. Similarly, the action can be placed in the locked condition with the main bolt 47 in its open or to its rear position. As before, the safety finger 105 will be in the path of the head 71 of the cross bolt 60 as the latter moves laterally in trying to become seated in the bores 21 and 22 in the receiver R as must occur in order to cock the rifle.

In the normal operation of firing my rifle with the main bolt 47 in its locked position as shown by FIGURE 2, the magazine 33 must first be filled with cartridges. This is done by forcing the magazine latch 34 rearwardly causing the magazine 33 to be released. The magazine 33 is pulled downwardly of the magazine housing 30, filled with cartridges and returned to its position in the magazine housing 30 with the latch 34 again engaging and retaining the magazine 33 in the housing 30. The operating handle knob 26 is then grasped and pulled directly rearwardly. This causes the operating handle 25 to pivot on the pin 64 and the leg 24 of the operating member 25 to swing outwardly of the slot 62 and through slot 23 in the receiver R carrying along with it the cross bolt 60. The cross bolt 60 will slide transversely of the receiver R along its locked axis to a position wherein the heads 70 and 71 of the cross bolt 60 are free of the walls of the bores 21 and 22 in the receiver R. This action is illustrated by FIGURE 24 wherein the solid lines show the various parts in their original locked and uncocked position and the dotted lines show the position of the heads 70 and 71 free of the bores 21 and 22 of the receiver R. The firing pin leg 49 has begun to move rearwardly by the ramp or camming surface 82 of the cross bolt 60, the firing pin leg 49 moving along the axis of the receiver R from the solid line to the dotted line position and the projection 65 arriving at a position close to but not touching the rear edge 66 of the receiver R. Also, the cone surface 73 of the cross bolt 60 has not cleared the bore 22 of the receiver R sufficiently to permit the shaft 72 of the cross bolt 60 to enter the slot 23 of the receiver R. The ramps 75 of the cross bolt 60 engage the flat angled surfaces 201 on the edge of the receiver R at the rear of the bore 22 so that the rearward force being applied on the operating knob 26 will cause the cross bolt 60 to move rearwardly from the solid line position shown by FIGURE 24 to the solid line position shown by FIGURE 25 as the surface 75 slides up the flat angled surface 201 of the receiver R. As the cross bolt 60 arrives at the solid line position shown by FIGURE 25 the shank 72 of the cross bolt 60 has been received by the slot 23 of the receiver and the firing pin leg 49 slides up the ramp 82 with the crest 181 of the front wall of the firing pin leg 49 arriving at the crest 180 of the notch 83 of the cross bolt 60. Since the firing pin leg 49 is being forced in a forwardly direction by the firing spring 76, the front wall surface 189 of the firing pin leg 49 will engage the surface 185 of the notch 83 on the cross bolt 49 and descend into the notch 83 to cam the cross bolt 60 outwardly of the receiver R to the dotted line position as shown by FIGURE 25. This movement of the cross bolt 60 transversely of the receiver R positions the edge portion 175 of the cross bolt 60 in spaced relation to the outer edge 202 of the receiver R to prevent the creation of friction between these surfaces when the cross bolt 60 is slid therealong to its rearmost position as shown by FIGURE 8 and returned to its locked position.

A further rearward force on the operating knob 26 will cause the main bolt 47 to slide rearwardly in the receiver R, the shank 72 of the cross bolt 60 sliding within the slot 23 of the receiver R. As the spent cartridge gripped by the extractors 94 is withdrawn from the firing chamber 86 and reaches the position of the ejector 91, the ejector 91 engages the cap of the spent cartridge forcing the forward end of the cartridge to swing toward the ejector opening 20 in the receiver forcing the extractors 94 to release the cartridge against the spring pressure 99. The cartridge then goes flying out of the receiver R through the opening 20. It is to be noted that when the cartridge that has been ejected was fired, upon releasing the firing pin leg 49, the sear 40 swings back upwardly after the trigger 46 is released, as explained hereinabove. Since the leg 49 and the firing pin 50 slid forwardly by virtue of the spring pressure 76, the leg 49 is now in the path of the sear projection 42, and the sear 40 is prevented from pivoting to its cocked position as shown by FIGURE 2. As a result of this, the searing surface 53 of the sear 40 is unable to be received by the searing notch 57 of the trigger 46. Now when the main bolt 47 slides rearwardly to eject the cartridge as aforementioned, the projection 42, of the sear 40 slides off the bottom surface of the leg 49 and moves upwardly into the slot 87 on the bottom surface of the main bolt 47 and the sear 40 pivots upwardly a sufficient distance to permit the searing surface 53 of the sear 40 to enter the searing notch 57 of the trigger 46. The sear 40 is now latched in its cocked position.

As the main bolt 47 continues to slide rearwardly, the forwardly facing shoulder 148 of the sear 42 engages the projection 100 of the bolt 47 as shown by FIGURE 7. The normal rearward movement of the bolt 47 is thus terminated. However, at this position, if it is desired to remove the main bolt 47 from the receiver R, all that need be done is to actuate the trigger 46 rearwardly. This compels the pivotal movement of the sear 40 about the pin 41 by the finger 45 of the trigger 46 engaging the sear finger 43. The shoulder 42 now swings downwardly of the receiver R out of the path of the projection 100 of the bolt 47, and the bolt 47 may be slid outwardly free of the receiver R. To return the bolt back to the operating position within the receiver R, the trigger 46 has to be actuated again to depress the sear shoulder 42 out of the path of the projection 100 as the main bolt 47 is slid forwardly to permit the shoulder 100 to pass unimpeded by the sear shoulder 42.

With the main bolt 47 at its rearward position as shown by FIGURE 7, the action is in position to return the bolt 47 to its locked and ready to be fired position. A forward force is now applied on the knob 26 and the bolt 47 begins to slide forwardly in the receiver R.

The cross bolt 60 is latched in its outward position by the edge 81 of the firing pin 50 resting in the notch 83 of the cross bolt 69 thereby preventing the cross bolt 60 from moving laterally of the receiver R during the closing or forward motion of the main bolt 47. The forward edge of the shoulder 89 engages the top cartridge in the magazine 33 and pushes it forwardly, the bullet end of the cartridge being received by the firing chamber 86. The bolt 47 moves forwardly until the lower forward edge 180 of the firing pin leg 49 engages the rearward facing shoulder 149 of the sear 40.

The camming surface 180 of the firing pin 50 operating on the shoulder 149 of the sear 40 forces the leg 44 of the sear 40 downwardly until a firm latching contact has been attained between the searing surface 53 on sear 40 and the searing surface in the notch 57 on the trigger 46. At this position, the cross bolt 60 has not been brought into alignment with the openings 21 and 22 yet, but that the beginning 76 of the inclined ramps 75 on the cone surface 73 of the cross bolt 60 will be positioned adjacent the inclined surface 201 at the bore 22 at the position of the slot 23. Forward pressure on the operating handle knob 26 will now commence to compress the main spring 76 and thereby allow the edge 81 of the firing pin 50 to become disengaged from the notch 83 of the cross bolt 60 which will allow the operating handle 25 to pivot on its pivot pin 64 and compel the cross bolt 60 to snap inwardly. The inward motion of the cross bolt 60 is momentarily arrested as the side of the receiver engages the inclined ramp 75 to force the cross bolt 60 and bolt 47 forwardly until the cross bolt 60 is in alignment with the bores 21 and 22 when the cross bolt 60 slides laterally and becomes properly seated and the bolt 47 is brought to its locked position. The cartridge which is in the firing chamber 86 is properly positioned in the bore 92 ready to be fired while the heads 97 of the extractors 94 are received by the slots 98. During this last short movement of the bolt 47 the leg 49 of the firing pin 50 is held against forward movement by the sear shoulder 149 as the main spring 76 becomes fully compressed and the firing pin 50 is placed in its fully cocked position as shown by FIGURES 11 and 26.

To fire the cartridge in the firing chamber 86 all that need be done is apply a rearward force on the trigger 46 which will cause the searing notch 57 in the trigger 46 to move forwardly from beneath the searing surface 53 of the sear arm 44 permitting the latter to descend. The cam surface 180 on the lower forward edge of the firing pin leg 49 immediately overrides the shoulder 149 on the sear 40 forcing it downwardly out of the path of the leg 49 of the firing pin 50 and permitting the compressed main spring 76 to force the released firing pin 50 forwardly in the slot 77 in the main bolt 47. The end 110 of the firing pin 50 will strike the rim of the bullet to fire same. Upon pulling the operating handle knob 26 rearwardly, the cycle of operation explained hereinabove can be repeated to expel the spent cartridge and position a cartridge from the magazine 33 in the firing chamber 86 ready to be fired.

The operation of my rifle 10 described above presupposes that the spent cartridge being extracted from the firing chamber 86 is not sticky or deformed so that the rearward movement of the main bolt 47 occurs as previously indicated and the projection 65 of the operating handle 25 does not engage or touch the rear end portion 66 of the receiver R. However, if the cartridge in the firing chamber 86 is sticky or deformed, then a greater than usual force is required to extract the cartridge from its position in the firing chamber 86. Upon grasping the operating handle knob 26 and pulling rearwardly in the normal manner, the leg 24 will swing outwardly of the slots 62 and 63 carrying the cross bolt 60 which slides laterally of the receiver R moving along its locked axis until the heads 70 and 71 are free of the walls of the bores 21 and 22. The projection 65 of the operating member 25 will be extremely close but not touching the end portion 66 of the receiver R and the rear edge of the ramp 75 of the cross bolt 60 engages the surface 201 of the receiver R. As explained hereinbefore if the cartridge in the firing chamber 86 is free, the main bolt 47 will commence to slide rearwardly in the receiver R and the projection 65 would move away from the end 66 of the receiver R. With a sticky cartridge in the firing chamber 86, the continued rearward force being applied on the handle knob 26 will cause the projection 65 to engage and abut against the end 66 of the receiver R effecting a lever action of high longitudinally directed pulling force. As the operating handle 25 is rotated further to the rear, the tremendous lever force being applied by the projection 65 on the receiver 66 as the cross bolt 60 moves laterally and outwardly of the receiver R causes the main bolt 47 to slide rearwardly a short distance as indicated by the distance the cross bolt 60 is rearward of the aligned bores 21 and 22 of the receiver R in FIGURE 27. The cartridge is now unstuck and partially withdrawn from its position in the firing chamber 86 and the cross bolt 60 is in position to slide rearwardly along the slots 23 of the receiver R, whereby the cartridge is then ejected and the action hereafter as described hereinabove in connection with the normal cocking of the rifle is repeated.

The operation and movements of the various parts and conditions of a firing cycle can be more clearly shown graphically as by FIGURE 28. The line x—x indicates the axis of the receiver R and the bore of the rifle 10. Point A indicates the position of the cross bolt 60 in the closed position as shown by the solid lines in FIGURE 24 and the breech block being locked. Line AB is the distance and direction the cross bolt 60 moves when the operating handle 25 is pulled while point B indicates the position of the cross bolt 60 as shown by the dotted lines in FIGURE 24, the heads 71 and 72 being free of the bores 21 and 22 respectively. At point B the ramp 75 of the cross bolt 60 engages the surface 201 of the receiver R and the line BF corresponds to the path that the ramp 75 slides along the surface 201 of the receiver R and the cross bolt 60 at point F assuming the solid line position shown by FIGURE 25. Line FG is the movement effected by the firing pin leg 49 sliding into the notch 83 under the force of the firing pin spring 76. Point G indicates the dotted line position shown by FIGURE 25. Line GH is the rearward path of the bolt 47 and cross bolt 60 to their open position. In this graphic illustration, the main bolt 47 was free to slide in the receiver R since the spent cartridge was not sticky nor deformed.

If a sticky cartridge is positioned in the firing chamber 86, the first movement of the cross bolt 60 as indicated by the line AB is the same as before. Now however, the bolt 47 at position B is not free to move because of the sticky cartridge and the projection 65 will engage the end 66 of the receiver R as indicated by the line BC to effect a lever action, C being the position to which the cross bolt 60 moved laterally. Now as the operating handle is rotated further, the tremendous levering force will pry the sticky cartridge loose as the cross bolt 60 moves laterally to its extreme outward position to the solid line position shown by FIGURE 27 and indicated by the line CD in FIGURE 28. If the cartridge were less sticky requiring less force to be withdrawn from the firing chamber 86, the point D of the line CD would move in the direction of the point F depending on how much force is first applied on the handle 25 in releasing the sticky cartridge in the firing chamber 86. From point D a further pull on the operating handle 26 will cause the main bolt 47 to slide rearwardly to its open position as indicated by the point H. Point E indicates the position in the forward movement of the main bolt 47 where the rear shoulder 149 of the sear lip 42 is engaged by the lower camming surface 180 of the firing pin leg 49 to prevent the firing pin 50 from moving forwardly until the trigger 46 is actuated in firing the rifle 10. This in effect allows the notch 83 to move away from the firing pin leg 49 allowing the cross bolt 60 to become free to move inwardly of the receiver R. As the main bolt 47 continues to slide forwardly in the receiver R by a forward force being exerted on the operating handle 26, the cross bolt 60 commences to slide inwardly toward the position line FB and along the line FB until the position B is reached where the firing pin 50 becomes fully cocked. Then the cross bolt 60 slides laterally into firing position with the heads 71 and 72 received by the bores 21 and 22. The distance S indicates the total lateral travel of the cross bolt 60. The distance M is the distance travelled by the cross bolt 60 during the primary extraction. Distance T is the tolerance necessary to make the escapement mechanism work and N is the distance which the firing pin falls.

It is to be noted that an important safety feature of my rifle 10 is that it cannot be fired when the cross bolt 60 is unlocked or even partially unlocked. At any point in the travel of the cross bolt 60 from B to A that is from the solid line position to the dotted line position as shown by FIGURE 24, the firing pin 50 can be released upon pulling the trigger 46. However, until the cross bolt 60 has been actuated to position the action as shown by FIGURE 26 with the cross bolt 60 in its locked position, the firing pin leg 49 will strike the ramp 82 somewhere above the low point 198 so that the firing end 110 of the firing pin 50 will not reach or touch the rim of cartridge to fire same.

After the action has been placed in a cocked and locked position and ready for firing, the action may be placed on safe position by pulling rearwardly on the safety button 101 to force the safety member 52 rearwardly and the safety head 104 be positioned in the path of the stop arm 58 of the trigger 46. At the same time the extension arm 109 of the stop member 52 slides along the slot 106 of the receiver R and places the stop flange 105 in the path of the head 71 of the cross bolt 60 as best shown by FIGURES 11 and 12. The trigger 46 cannot be pulled at this time because the stop arm 58 abutting against the stop head 104 prevents the forward movement of the searing notch 57. Also due to the stop flange 105 of the extension arm 109 being in the path of the head 71 of the cross bolt 60, the cross bolt 60 cannot slide out of the bores 21 and 22, and therefore the operating handle 25 cannot be actuated nor can the main bolt 47 be withdrawn rearwardly until the stop member 52 has been pushed forwardly of the safe position. Likewise after the main bolt 47 has been brought to its open or rearward position and the safety member 52 pulled rearwardly to the safe position, it is not possible to bring the action to its cocked and locked position because the stop flange 105 of the extension arm 104 of the stop member 52 will again be in the path of the head 71 of the cross bolt 60. So long as this stop flange 105 is in the safe position, the cross bolt 60 is prevented from moving into or out of the bores 21 and 22 and therefore prevent operation of the rifle while the safety is in the safe position.

I claim:

1. A straight pull bolt action rifle comprising a main bolt having a transversely disposed bore, a cross bolt slidably positioned in said bore, said cross bolt having one end portion extending beyond a side wall of said main bolt, an operating handle, pivot means mounting said operating handle on said main bolt, and connecting means joining said operating handle and said cross bolt whereby upon actuation of said operating handle said cross bolt is slidably moved along said bore with said one end of said cross bolt being positioned within the confines of said side wall of said main bolt.

2. A straight pull bolt action rifle comprising a main bolt having a transversely disposed bore, a cross bolt slidably positioned in said bore, said cross bolt having end portions extending beyond side walls of said main bolt, an operating handle, means pivotally mounting said operating handle on said main bolt, and connecting means joining said operating handle and said cross bolt whereby upon actuation of said operating handle said cross bolt is slidably moved along said bore with one of said end portions of said cross bolt being positioned within the confines of one of said side walls of said main bolt.

3. A straight pull bolt action rifle comprising a main bolt having a transversely disposed bore and a slot extending from said bore to one end of said main bolt, a cross bolt having a shank portion slidably positioned in said bore and head portions extending beyond side walls of said main bolt, one of said head portions being slidable along said transverse bore and the other of said head portions being larger than said transverse bore, operating means having a leg portion lying in said slot on said bolt, means pivotally mounting said operating means at said one end of said main bolt, connecting means joining said leg portion of said operating means and said enlarged head portion of said cross bolt and handle means mounted on said operating means for actuating said cross bolt.

4. A straight pull bolt action rifle comprising a main bolt having a transversely disposed bore and a slot extending from said bore to one end of said main bolt, a cross bolt having a shank portion slidably positioned in said bore and head portions extending beyond side walls of said main bolt, one of said head portions being slidable along said transverse bore and the other of said head portions being larger than said transverse bore, operating means having a leg portion lying in said slot on said bolt, means pivotally mounting said operating means at one end of said main bolt, connecting means joining said leg portion of said operating means and said enlarged head portion of said cross bolt, handle means mounted on said operating means for actuating said cross bolt, said handle means, said operating means and said cross bolt lying substantially in a plane and stop means operatively connected to said cross bolt limiting the transverse sliding movement of said cross bolt in said main bolt.

5. A straight pull bolt action rifle comprising a main bolt having a transversely disposed bore and a longitudinally disposed slot, a cross bolt slidably positioned in said bore, said cross bolt having one end portion extending beyond a side wall of said main bolt, means operatively connected to said cross bolt for sliding said cross bolt in said transverse bore and positioning said one end portion of said cross bolt within the confines of said main bolt, firing pin means slidably positioned in said slot and means mounted on said firing pin means and actuated by said operatively connected means for sliding said firing pin means along said slot to a partially cocked position upon actuation of said cross bolt.

6. A straight pull bolt action rifle comprising a main bolt having a transversely disposed bore and a longitudinally disposed slot, a cross bolt having head portions extending beyond side walls of said main bolt, one of said head portions being slidable along said transverse bore, means operatively connected to said cross bolt at the other of said head portions for sliding said cross bolt in said transverse bore and positioning said one of said head portions within the confines of said main bolt, firing pin means slidably positioned in said slot and means mounted on said firing pin means and actuated by said operatively connected means for sliding said firing pin means along said slot to a partially cocked position upon actuation of said cross bolt.

7. A straight pull bolt action rifle comprising a main bolt having a transversely disposed bore and a plurality of longitudinally disposed slotted portions, a cross bolt having a shank portion slidably positioned in said bore and head portions extending beyond side walls of said main bolt, one of said head portions being slidable along said transverse bore and the other of said head portions being larger than said transverse bore, operating means having a leg portion lying in one of said slotted portions on said bolt, means pivotally mounting said operating means at said one end of said main bolt, connecting means joining said leg portion of said operating means and said enlarged head portion of said cross bolt, handle means mounted on said operating means for actuating said cross bolt, firing pin means slidably positioned in another of said slotted portions and means mounted on said firing pin means and actuated by said operatively connected means for sliding said firing pin means along said other of said slotted portions upon actuation of said cross bolt.

8. A straight pull bolt action rifle comprising a main bolt having a transversely disposed bore and a plurality of longitudinally disposed slotted portions, a cross bolt having a shank portion slidably positioned in said bore and head portions extending beyond side walls of said main bolt, one of said head portions being slidable along said transverse bore and the other of said head portions being larger than said transverse bore, operating means having a leg portion lying in one of said slotted portions on said bolt, means pivotally mounting said operating means at said one end of said main bolt, connecting means joining said leg portion of said operating means and said enlarged head portion of said cross bolt, handle means mounted on said operating means for actuating said cross bolt, firing pin means slidably positioned in another of said slotted portions and means mounted on said cross bolt engaging said firing pin means whereby upon operating said handle means said cross bolt is slid along said bore and said firing pin means is partially cocked, and stop means operatively connecting said cross bolt and said firing pin means limiting the transverse sliding movement of said cross bolt in said main bolt.

9. A straight pull bolt action rifle comprising a main bolt having a transversely disposed bore and a plurality of longitudinally disposed slotted portions, a cross bolt having a shank portion slidably positioned in said bore and head portions extending beyond side walls of said main bolt, one of said head portions being slidable along said transverse bore and the other of said head portions being larger than said transverse bore, operating means having a leg portion lying in one of said slotted portions on said bolt, means pivotally mounting said operating means at said one end of said main bolt, connecting means joining said leg portion of said operating means and said enlarged head portion of said cross bolt, handle means mounted on said operating means for actuating said cross bolt, said shank portion of said cross bolt having a cam surface, firing pin means slidably positioned in another of said slotted positions, said firing pin means having a leg portion engaging said cam surface of said cross bolt whereby upon actuation of said handle means said cross bolt is slid transversely in said bore and said firing means is slid longitudinally in said other of said slotted portions.

10. A straight pull bolt action rifle comprising a main bolt having a transversely disposed bore and a plurality of longitudinally disposed slotted portions, a cross bolt having a shank portion slidably positioned in said bore and head portions extending beyond side walls of said main bolt, one of said head portions being slidable along said transverse bore and the other of said head portions being larger than said transverse bore, operating means having a leg portion lying in one of said slotted portions on said bolt, means pivotally mounting said operating means at said one end of said main bolt, connecting means joining said leg portion of said operating means and said enlarged head portion of said cross bolt, handle means mounted on said operating means for actuating said cross bolt, said shank portion of said cross bolt having a cam surface, firing pin means slidably positioned in another of said slotted portions, said firing pin means having a leg portion engaging said cam surface of said cross bolt whereby upon actuation of said handle means said cross bolt is slid transversely in said bore and said firing pin means is slid longitudinally in said other of said slotted portions to at least a partially cocked position, and stop means operatively connected to said cross bolt limiting the transverse sliding movement of said cross bolt in said main bolt.

11. A straight pull bolt action rifle comprising a main bolt having a transversely disposed bore and a plurality of slotted portions, a cross bolt slidably positioned in said transverse bore, said cross bolt having a small head at one end, an enlarged head at the other end and a shank portion joining said heads, said heads normally extending beyond side walls of said main bolt, said shank portion having an inclined surface along a rear edge and a notch at a high point in said inclined surface, a firing pin slidably mounted in one of said slotted portions, said firing pin having a leg portion in contact relation with said inclined recess of said shank portion and extending through said other slotted portion in said main bolt, spring means yieldingly urging said leg portion in the direction of said contact relation with said shank portion of said cross bolt, an operating handle having a leg portion and a main body portion at substantially right angle thereto, said operating handle leg portion extending transversely at one end of said main bolt while said main body portion extends longitudinally of said bolt in the direction of said enlarged head of said cross bolt, a pivot pin mounting said leg of said operating handle to said main bolt, link means connecting said main body portion of said operating handle and said cross bolt, stop means operatively connected to said leg portion preventing said cross bolt from leaving said transverse bore in said main bolt and knob means mounted on said operating handle for pivotal movement of said operating handle.

12. A straight pull bolt action rifle comprising a main bolt having a transversely disposed bore and a longitudinally disposed slot, a cross bolt slidably positioned in said bore, said cross bolt having one end portion extending beyond a side wall of said main bolt, means operatively connected to said cross bolt for sliding said cross bolt in said transverse bore and positioning said one end portion of said cross bolt within the confines of said main bolt, firing pin means slidably positioned in said slot, means mounted on said firing pin means and actuated by said operatively connected means for sliding said firing pin means along said slot to at least a partially cocked position upon actuation of said cross bolt and further means mounted on said firing pin means for maintaining said firing pin means in said partially cocked position.

13. A straight pull bolt action rifle comprising a main bolt having a transversely disposed bore and a longitudinally disposed slot, a cross bolt slidably positioned in said bore, said cross bolt having a shank portion and an end portion extending beyond a side wall of said main bolt, said shank portion having a cam surface and a notch adjacent said cam surface, firing pin means slidably positioned in said slot, said firing pin means having a leg portion engaging said cam surface of said cross bolt, a spring yieldingly maintaining said leg portion and said cam surface in contact relation, means operatively connected to said cross bolt for sliding said cross bolt in said transverse bore to a position wherein said one end portion of said cross bolt is positioned within the confines of said side wall of said main bolt and said leg portion is slid along said cam surface and rests in said notch on said shank of said cross bolt.

14. A straight pull bolt action rifle comprising a main bolt having a transversely disposed bore and a plurality of longitudinally disposed slotted portions, a cross bolt having a shank portion slidably positioned in said bore and head portions extending beyond side walls of said main bolt, one of said head portions being slidable along said transverse bore and the other of said head portions being larger than said transverse bore, said shank portion having a cam surface and a notch adjacent said cam surface, firing pin means slidably positioned in said slot, said firing pin means having a leg portion engaging said cam surface of said cross bolt, a spring yieldingly maintaining said leg portion and said cam surface in contact relation, an operating handle having a leg portion and a main body portion at substantially right angle thereto, said operating handle leg portion extending transversely at one end of said main bolt while said main body portion extends longitudinally of said bolt in the direction of said enlarged head of said cross bolt, a pivot pin mounting said leg of said operating handle to said main bolt, link means connecting said main body portion of said operating handle and said cross bolt, stop means operatively connected to said operating handle preventing said cross bolt from leaving said transverse bore in said main bolt, knob means mounted on said operating handle for pivotal movement of said operating handle whereby upon manipulation of said knob means said cross bolt is slid along said transverse bore to a position wherein said small head is positioned within the confines of said side walls of said bolt and said firing pin is slid longitudinally against said spring pressure and positioned on said notch on said shank of said cross bolt.

15. A straight pull bolt action rifle comprising a receiver, said receiver having aligned bores in side walls and a slot extending from one of said bores to an end of said receiver, a main bolt slidably positioned in said receiver, said main bolt having a transversely disposed bore in alignment with said bores in said receiver and a plurality of longitudinally disposed slots, a cross bolt slidably positioned in said bore, said cross bolt having a shank portion capable of sliding along said slot in said receiver, a head mounted on each end of said shank received by said aligned bores in said receiver, one of said heads having a conical surface between said head and said shank portion and a cam surface extending along said conical surfce, an operating hndle having a leg portion and a main body portion lying along one of said slots in said main bolt, pivot means mounting said leg portion of operating handle to said main bolt in proximity of said one end of said receiver, link means connecting said main body portion of said operating handle and said one of said heads of said cross bolt whereby on the sliding movement of said cross bolt along said slot on said receiver prior to the alignment of said cross bolt and said aligned bores in said receiver, said cam surface engages an edge of said last named slot causing the further sliding movement of said main bolt as said cross bolt slides into position to seat said head portions of said cross bolt in said aligned bores of said receiver.

16. A straight pull bolt action rifle comprising a receiver, said receiver having aligned bores in side walls and a slot extending from one of said bores to an end of said reeciver, a main bolt slidably positioned in said receiver said main bolt having a transversely disposed bore in alignment with said bores in said receiver and a plurality of longitudinally disposed slots, a cross bolt slidably positioned in said bore, said cross bolt having a shank portion capable of sliding along said slot in said receiver, a head mounted on each end of said shank received by said aligned bores in said receiver, said shank portion having a cam surface along one edge and a notch in proximity of one end of said cam surface, an operating handle having a leg portion and a main body portion lying along one of said slots in said main bolt, pivot means mounting said leg portion of operating handle to said main bolt in proximity of said one end of said receiver, link means connecting said main body portion of said operating handle and said one of said heads of said cross bolt, a firing pin slidably mounted in an other of said slotted portions on said main bolt, said firing pin having a leg portion in contact relation with said cam surface of said cross bolt shank and extending through said other of said slotted portions in said main bolt, spring means yieldingly maintaining said firing pin leg portion in contact relation with said cam surface, a sear pivotally mounted on said rifle, said sear having a shoulder in the path of movement of said firing pin leg portion whereby upon applying a force toward one end of said receiver on said operating handle said cross bolt is slid along said transverse bore, said shank is received by said slot in said receiver, and said firing pin leg slides along said cam surface and is received by said notch against said spring pressure to partially cock said firing pin and upon a reverse force applied to said operating handle, said cross bolt slides to a position prior to the alignment of said cross bolt and said aligned bores in said receiver, said leg portion of said firing pin engages said sear shoulder to cause said further cocking of said firing pin against said spring pressure as said leg portion of said firing pin is lifted from said notch on said cross bolt shank.

17. A straight pull bolt action rifle comprising a receiver, said receiver having aligned bores in side walls and a slot extending from one of said bores to an end of said receiver, a main bolt slidably positioned in said receiver said main bolt having a transversely disposed bore in alignment with said bores in said receiver and a plurality of longitudinally disposed slots, a cross bolt slidably positioned in said bore, said cross bolt having a shank portion capable of sliding along said slot in said receiver, a head mounted on each end of said shank received by said aligned bores in said receiver, one of said heads having a conical surface between said head and said shank portion and ramp extending along said conical surface, said shank portion having a cam surface along one edge and a notch in proximity of one end of said cam surface, an operating handle having a leg portion and a main body portion lying along one of said slots in said main bolt, pivot means mounting said leg portion of operating handle to said main bolt in proximity of said one end of said receiver, link means connecting said main body portion of said operating handle and said one of said heads of said cross bolt, a firing pin slidably mounted in an other of said slotted portions on said main bolt, said firing pin having a leg portion in contact relation with said cam surface of said cross bolt shank and extending through said other of said slotted portions in said main bolt, spring means yieldingly maintaining said firing pin leg portion in contact relation with said cam surface, a sear pivotally mounted on said rifle, said sear having a shoulder in the path of movement of said firing leg portion whereby upon applying a force toward one end of said receiver on said operating handle said cross bolt is slid along said transverse bore, said shank is received by said slot in said receiver, and said firing pin leg slides along said cam surface and is received by said notch against said spring pressure to partially cock said firing pin and upon a reverse force applied to said operating handle, said cross bolt slides to a position prior to the alignment of said cross bolt and said aligned bores in said receiver, to cause said ramp to engage an edge of said last named slot and effect a further sliding movement of said main bolt as said leg portion of said firing pin engages said shoulder of said sear and lifts said leg portion from said notch on said cross bolt shank as said cross bolt slides into position to seat said head portions of said cross bolt in said aligned bores of said receiver thereby fully cocking said firing pin and locking said cross bolt in said receiver.

18. The structure as recited by claim 17 taken in combination with safety means slidably positioned in said receiver, said safety means having a finger portion mounted in alignment with said bores in said receiver and engaging the other of said heads of said cross bolt preventing sliding movement of main bolt in said receiver.

19. A firearm comprising a barrel portion, a receiver portion positioned in axial alignment with said barrel portion, a breech closing member slidably positioned in said receiver portion said breech closing member having a transversely disposed bore, a cross bolt slidably positioned in said last named bore, said cross bolt engaging said receiver and preventing the sliding movement of said breech closing member, operating means pivotally mounted on said breech closing member, means operatively connecting said operating means and said cross bolt whereby upon actuation of said operating means said cross bolt is slid out of engagement with said receiver portion to permit the sliding movement of said breech closing member in said receiver.

20. A firearm comprising a barrel portion, a receiver portion positioned in axial alignment with said barrel portion, a breech closing member slidably positioned in said receiver portion, said breech closing member and said receiver portion each having a transversely disposed bore in alignment with each other, a cross bolt slidably positioned in said bores in engagement with said receiver portion and preventing the sliding movement of said breech closing member, said receiver portion having a longitudinally disposed slot extending to said bore, operating means pivotally mounted on said breech closing member, means operatively connecting said operating means and said cross bolt whereby upon actuation of said operating means said cross bolt is slid out of said bore in said receiver portion to permit the sliding movement of said breech closing member in said receiver and said cross bolt along said slot.

21. A firearm comprising a barrel portion, a receiver portion joined at one end in axial alignment with said barrel portion, a breech closing member slidably positioned in said receiver portion, cartridge extracting means secured to said breech closing member at said one end of said receiver portion, said breech closing member and said receiver portion each having a transversely disposed bore in alignment with each other, a cross bolt slidably positioned in said bores in engagement with said receiver portion and preventing the sliding movement of said breech closing member, said receiver portion having a longitudinally disposed slot extending to said bore, an operating lever pivotally mounted at the other end of said breech closing member, said operating lever having a first arm portion terminating in close proximity of the other end of said receiver portion and a second arm portion connected to said cross bolt whereby upon the pivotal movement of said operating lever said cross bolt is slid along said bores out of engagement with said receiver portion and said first arm portion abuts against said other end of receiver portion and imparts a force on said breech closing member to slide said breech closing member along said receiver portion and said cartridge extracting means away from said barrel.

References Cited by the Examiner
UNITED STATES PATENTS 2,296,242  9/1942  Brewer _____ 42—16

BENJAMIN A. BORCHELT, *Primary Examiner.*